Oct. 13, 1970  F. L. FAHY  3,533,294
DIRECTLY SETTABLE CONTROLLER
Filed July 20, 1966

INVENTOR.
FRANCIS L. FAHY
BY
ATTORNEYS

3,533,294
DIRECTLY SETTABLE CONTROLLER

Francis L. Fahy, Trumbull, Conn., assignor to American Chain & Cable Co., Inc., New York, N.Y., a corporation of New York
Filed July 20, 1966, Ser. No. 566,538
Int. Cl. G01l 7/04; H01h 35/36
U.S. Cl. 73—411                                   5 Claims

ABSTRACT OF THE DISCLOSURE

A controller for providing an output signal in accordance with a particular value of a variable pressure, the controller including a control element positionable at selected locations corresponding to the value of the variable pressure, an indicator for indicating the value of said variable pressure corresponding to the location of the control element, a Bourdon tube for sensing changes in said pressure, and an actuating means connected to the Bourdon tube for actuating the control element upon sensing of the particular value of pressure.

---

This invention relates to controllers, and particularly to controllers of the type which monitor the value of a given variable and emit a signal indicative of the value of that variable relative to one or more predetermined values thereof, called set points.

Various kinds of controllers of this general type are known. However, all have one or more drawbacks which limit their utility to most industrial users of such instruments. In one type of controller, the control variable is a pressure; the controller may be set to a given value of pressure, and will then emit one or another signal depending on whether the control variable is above or below this given value. One drawback of known controllers has been the difficulty involved in determining the set point. At least initially, such set point must be determined by trial and error or by using an external gage to indicate when the desired set point pressure has been reached, at which time the controller may be adjusted to change from one output signal to another.

A further drawback of known controllers is their use of overload protectors which introduce an unnecessary source of error into the controller operation. If, as is often the case, the pressure sensing device is a Bourdon tube and the control element is an electrical switch, some mechanism should be provided for limiting the travel of the Bourdon tube actuating element so as not to overstress the switch. Most switches used in this type of application are sensitive microswitches, and may be easily damaged. The accepted way to prevent such damage is by mounting the switch body so that it is free to rotate about one mounting point. The switch is maintained in the desired position by means of springs. When an overload occurs, the springs give way and the switch rotates out of the way of the pressure sensing element. However, the controller set point may then vary slightly from one actuation to the next, due to the friction introduced in this arrangement. Moreover, the elastic properties of the springs change with time.

Still a further drawback of conventional controllers is that no convenient way is provided for displaying the actual instantaneous value of the control variable relative to the set point.

With these limitations in mind, a controller has been developed which overcomes the drawbacks of conventional devices and which is highly accurate, simple to reset, and effectively displays the controller set point along with the instantaneous value of the control variable.

In order to achieve these improvements as well as others, the invention contemplates broadly a controller for providing an output signal in accordance with the value of a control variable, comprising a control element, locating means for fixedly locating the control element at various points along an arc defining a center of rotation, which points correspond to values of said control variable, a first indicator connected to the locating means for indicating the value of said control variable corresponding to the position of the locating means, moveable actuator means for actuating the control element, and means for positioning the actuator means along said arc in accordance with the instantaneous value of the control variable so that when the instantaneous value of the control variable equals the value corresponding to the location of the control element the latter is actuated. Moreover, a second separate positioning means may be provided for positioning a second indicator on the same dial as the first mentioned indicator to indicate the instantaneous value of the control variable. In this manner, the second indicator displays at a glance the instantaneous value of the control variable and its relationship to the controller set point, which is at all times shown by the first mentioned indicator.

Preferred embodiments of the invention will be described below with reference to the accompanying drawings, wherein.

The embodiments to be described relate to controllers for which the control variable is a pressure, although it is within the scope of the invention to provide controllers responsive to other control variables, such as temperature.

Figure 1:
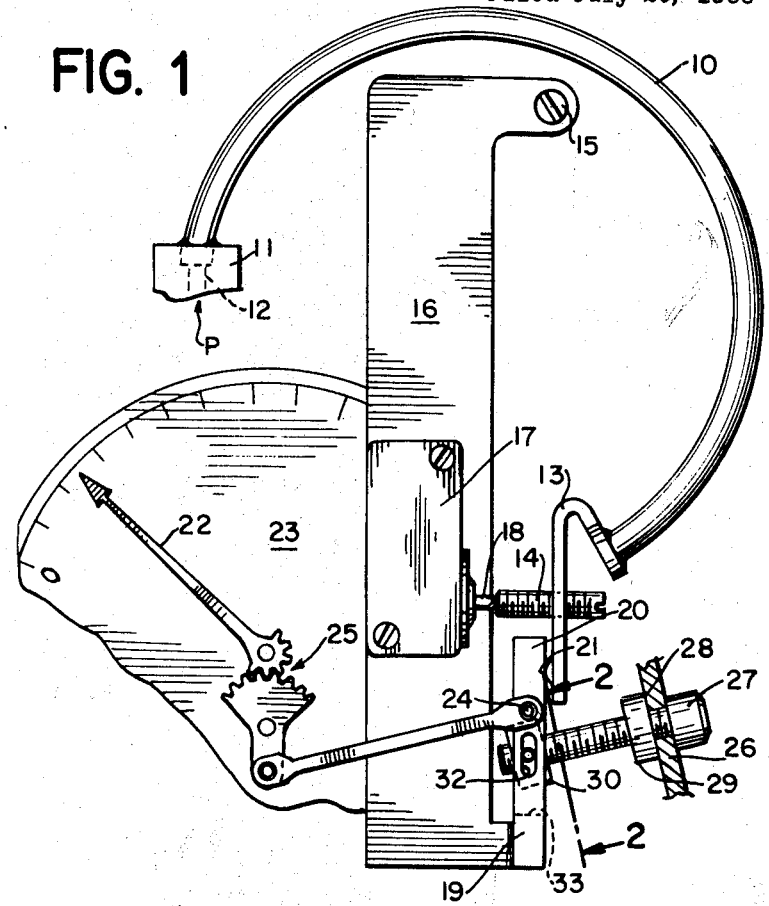
FIG. 1 is a front elevation, partially schematic, of a controller embodying the invention.

As shown in FIG. 1, the controller includes a Bourdon tube 10 which is fastened at its open end to a controller body 11. Any known means, such as that indicated by 12 may be provided at this open end for placing the Bourdon tube in communication with a source of pressure. The value of this pressure is the control variable. An actuator element 13 is fixed to or forms part of the closed end of the Bourdon tube, which actuator element includes an adjustment screw 14 in the embodiment illustrated.

Over the normal range of operating pressure of a Bourdon tube its closed end, and with it the actuator element 13 describes a path which is substantially a circular arc, thus defining a center of rotation 15 for the tube. According to the invention, an arm 16 is mounted for rotation on the controller body so that it pivots about the center of rotation 15 so defined. A control element 17 is mounted on the arm 16 and includes a control point 18 positioned so that as the arm pivots the control point 18 describes an arc substantially congruent with the arc described by the tip of the adjustment screw 14. While many different types of control elements may be used, the one described in connection with this embodiment is an electric microswitch having as its control point 18 a button which lies substantially tangent to the arc described by the tip of the adjustment screw 14 at all positions of the arm 16.

By placing the pivot point at the center of rotation 15 such that when the arm 16 is swung about the pivot point to various controller set points, the control point 18 always lies substantially along the arc described by the tip of the screw 14 a relatively simple and precise mechanism is provided for assuring proper functioning of the controller at any desired set point.

The term 16 may include an extension 19 in the direction of the actuator element 13 so placed to form an abutment surface 20 against which the element 13 may press. This limits the travel of the latter, preventing damage to the control element 17. For greater accuracy, a knob 21 may be formed on the actuator for contacting the abutment surface 20. In operation, the adjustment screw 14 should be set so that knob 21 contacts the abutment surface 20 immediately after the control element 17 has been actuated by the tip of the scew 14. It will be appreciated that by providing the geometry described above, only one adjustment of this screw will be necessary; it will then be at the proper setting for any desired set point of the controller.

At some point on the arm 16 a pivot may be provided for connecting to the arm a suitable linkage 25 for controlling the motion of a pointer 22 on a dial 23. As indicated in FIG. 1, the linkage 25 may be connected to the extension 19 of arm 16 by a pivot 24 and may comprise any appropriate gearing mechanism.

In the embodiment of FIG. 1, adjustment means is provided for presetting the position of the arm 16, and thus the set point of the controller. The adjustment means may include an upstanding plate 26 mounted on or forming an integral part of the controller body 11. A screw 27 extends through an unthreaded hole in the plate 26, and may be held there so that it is free to rotate by means of a washer 28 and lock nuts 29. Alternatively, any other convenient means may be used which allows the screw to rotate freely with negligible axial movement.

Figure 2:
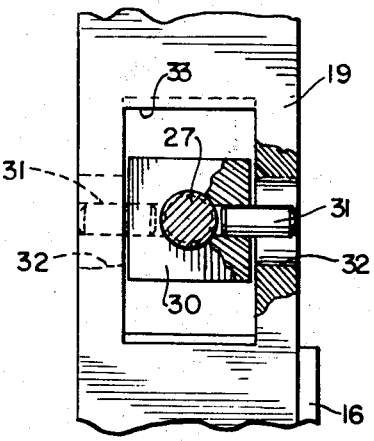
FIG. 2 is a partial sectional view taken along line 2—2 of FIG. 1.

The screw 27 extends through a nut or sleeve 30 which is internally threaded to engage it. The nut 30 may be provided with a pair of laterally extending studs 31 which ride in vertical slot 32 formed in the interior of a cut-out portion 33 of the extension 19 (see FIG. 2). The studs 31 should be of sufficient hardness and diameter to withstand mechanical shocks encountered in use. In this manner, a sufficient number of degrees of freedom is provided so that the controller set point may be adjusted by rotation of screw 27, causing arm 16 to rotate about pin 15. Any other appropriate adjustment mechanism may be provided. As will be apparent, the pointer 22 will indicate on the dial 23 exactly at what pressure the controller is set, so that such set point will be immediately apparent merely by looking at the controller.

In order to set the controller at a desired set point it is only necessary to adjust the screw 28 so that pointer 22 indicates the actual pressure at which the controller is to be actuated. No external gage is required, nor is any experimentation necessary. Due among other reasons to the provision of abutment surface 20, moreover, the controller will be actuated at the predetermined set point with a high degree of accuracy. This is because provision of the surface 20 allows the control element to be firmly mounted to arm 16 without springs, so that only the elastic properties of the Bourdon tube determine the actuation point of the controller.

Conveniently, the control element 8 (in the embodiment shown an electric switch) may be of the type which is normally closed, or in the "on" position. By this means, at pressures below the predetermined set point, the switch is "off" and will be turned on when the Bourdon tube 10 causes the actuator element 13 to move away from the control element 17.

The controller may alternatively be operated in a mode such that the pressure is normally higher than the set point pressure, an indication being desired when the pressure drops below that point. In this mode the control element 17, a normally open switch, would close to provide the desired signal. If the opposite type switch is used in either mode, a current stoppage will signal the condition sought to be detected. The controller may of course be operated in any other mode desired. The control element, switch 17 in the embodiment illustrated, may be connected to signal the change in its state to any type of equipment such as a light or alarm signal, or a process control computer. In the embodiment shown, such signal may be transmitted by wires (not shown) directly connected to the switch.

Figure 3:
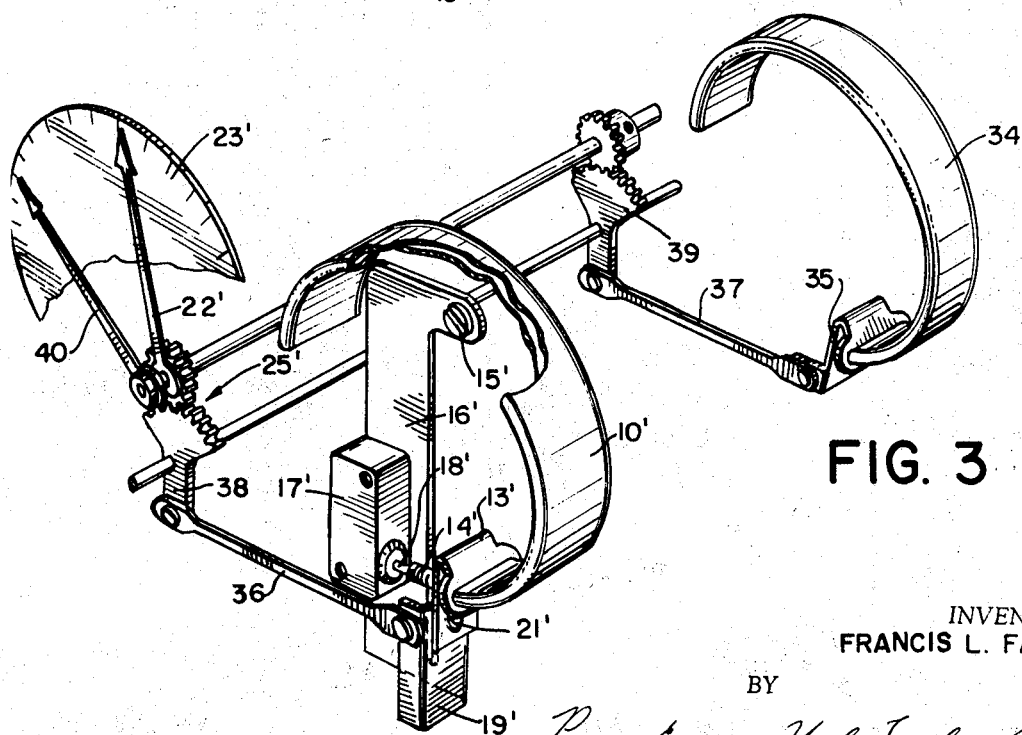
FIG. 3 is a perspective view of an embodiment of the invention incorporating two indicators.

A further embodiment of the invention is illustrated in FIG. 3 wherein two Bourdon tubes are provided, one for actuating the controller at the desired set point, and second for indicating the instantaneous value of the pressure being monitored. A first Bourdon tube 10' is provided for actuating the controller as illustrated in FIG. 1, and therefore primed reference numerals are employed to designate it and the associated parts which correspond in structure and function to those of the FIG. 1 embodiment. In addition, a second Bourdon tube 34 is provided which conveniently may be identical to the tube 10' and may be mounted so that the movement of a fixture 35, provided on the closed end of the tube 34, is in a plane parallel to that of the arc defined by the motion of the actuator element 13'. In this way linkage arms 36 and 37 may be connected to actuate gear elements 38 and 39 mounted on a common shaft, which in turn actuate coaxially mounted pointers 22' and 40, respectively. The gear element 39 may conveniently drive the pointer 40 through a shaft which extends through a hub of the pointer 22', so that both pointers rotate about a common axis and indicate their respective pressures on the dial 23'. The open ends of Bourbon tubes 10' and 34 may be connected by a common connector to a source of pressure, the value of which constitutes the control variable.

If the Bourdon tube (or tubes) is made of bronze, the unit can be made to operate over ranges from approximately zero to 15 p.s.i. up to zero to 1000 p.s.i. If, for example, K-Monel tubing is used, ranges as large as zero to 10,000 p.s.i. may be achieved.

I claim:
1. A controller for providing an output signal in accordance with the value of a variable pressure, comprising:
 (a) a control switch element;
 (b) locating means for fixedly locating said control element at various points along an arc drawn about a predetermined center of rotation, which points correspond to values of said variable pressure, said locating means comprising an arm pivoted for rotation about said center of rotation;
 (c) a first indicator connected to said locating means for indicating the value of said variable pressure corresponding to the position of the locating means;
 (d) a first Bourdon tube having one end in communication with said pressure and a closed free end movable in response to changes in said pressure;
 (e) movable actuator means supported on the free end of said Bourdon tube for actuating said control element;
 (f) means for mounting said Bourdon tube with actuator means positioned to move about said predetermined center of rotation and along said arc in accordance with the instantaneous value of said variable pressure, so that when the instantaneous value of said variable pressure equals the value coreponding to the location of the control element the latter is actuated; and
 (g) an abutment surface disposed on said arm in the path of movement of said actuator means toward said control element for contacting the actuator means and preventing the latter from exerting substantially more force on said control element than is necessary to actuate it.

2. A controller as defined in claim 1 including a controller body, wherein said control element locating means includes adjustments means linking a first point on said arm to a second point on the controller body, said first and second points being spaced from the center of rotation, said adjustments means being variable to change the separation between said first and second points and thereby change the controller setting.

3. A controller as defined in claim 1 including a controller body, wherein said control element locating means includes a screw element rotatably mounted but axially constrained in said controller body, said arm having a threaded nut which is slidably and rotatably mounted thereon and engaged by the screw element so that rotation of the screw element positively controls the position of the arm and thereby the controller set point.

4. A controller for providing an output signal in accordance with the value of a variable pressure comprising:
  (a) a control switch element;
  (b) locating means for fixedly locating said control element at various point along an arc defining a center of rotation, which points correspond to values of said variable pressure, said locating means including an arm pivoted for rotation about said center of rotation, said arm including an abutment surface;
  (c) a first indicator connected to said locating means for indicating the value of said variable pressure corresponding to the position of the locating means;
  (d) a first Bourdon tube having one end in communication with said pressure and a closed free end movable in response to changes in said pressure;
  (e) movable actuator means supported on the free end of said Bourdon tube for actuating said control element;
  (f) means for mounting said Bourdon tube with the actuator means positioned to move along said arc in accordance with the instantaneous value of said variable pressure, so that when the instantaneous value of said variable pressure equals the value corresponding to the location of the control element the latter is actuated, said actuator means including a portion disposed to contact the abutment surface of said locating means for preventing the actuator means from exerting substantially more force on said switch than is necessary to actuate it;
  (g) a second Bourdon tube having an open end in communication with said pressure;
  (h) a second indicator linked to the second Bourdon tube for indicating the instantaneous value of said pressure;
  (i) a common dial to which both the first and second indicator are referenced.

5. A controller as defined in claim 1 wherein said first and second indicators respectively include first and second pointers mounted to rotate about a common axis for indicating respective values of pressure on a single scale on said common dial.

References Cited
UNITED STATES PATENTS

| | | | |
|---|---|---|---|
| 1,779,294 | 10/1930 | Schlaich | 200—81.8 |
| 3,188,419 | 6/1965 | Barksdale | 200—81.8 |
| 3,276,260 | 10/1966 | Weiler | 73—368.6 |

LOUIS R. PRINCE, Primary Examiner

D. E. CORR, Assistant Examiner

U.S. Cl. X.R.

200—81.8